United States Patent
Bachmann

[11] Patent Number: 5,220,970
[45] Date of Patent: Jun. 22, 1993

[54] WEIGHING APPARATUS WITH STANDSTILL CONDITION INDICATING MEANS

[75] Inventor: Rudolph Bachmann, Bertschikon, Switzerland

[73] Assignee: Mettler - Toledo AG, Greifensee, Switzerland

[21] Appl. No.: 878,473

[22] Filed: May 5, 1992

[30] Foreign Application Priority Data

Jul. 9, 1991 [CH] Switzerland .................. 2034/91

[51] Int. Cl.$^5$ .................. G01G 23/32; G01G 23/10
[52] U.S. Cl. .................. 177/178; 177/185
[58] Field of Search .................. 177/177, 178, 185

[56] References Cited

U.S. PATENT DOCUMENTS

| | | | |
|---|---|---|---|
| 3,789,937 | 2/1974 | Strobel et al. | 177/210 |
| 3,860,802 | 1/1975 | Knothe et al. | 177/210 X |
| 4,103,750 | 8/1978 | Melcher et al. | 177/185 |
| 4,200,896 | 4/1980 | Baumann | 364/567 X |
| 4,553,619 | 11/1985 | Fujinaga | 177/185 |
| 4,782,904 | 11/1988 | Brock | 177/185 X |
| 4,825,966 | 5/1989 | Langford et al. | 177/177 |

OTHER PUBLICATIONS

"Operating Instructions Mettler AM/PM Balancers", Mettler–Toledo AG Bulletin of 1990.

*Primary Examiner*—George H. Miller, Jr.
*Attorney, Agent, or Firm*—Laubscher & Laubscher

[57] ABSTRACT

Weighing apparatus including a stability display indicator (SA) arranged adjacent the load read-out display (RA) for indicating when the movement of the load-receiving member relative to the housing has diminished to a quasi-stable condition within a given tolerance range, thereby to shorten the time required to perform one or more weighing operations. An automatic standstill detector (ASD) contains a control system which, upon change of a tolerance range display, for example, by darkening or illuminating individual indicators matched up with the tolerance ranges, signals the moment at which the load receiving member achieves a given quasi-stable standstill condition.

8 Claims, 2 Drawing Sheets

WEIGHING APPARATUS WITH STANDSTILL CONDITION INDICATING MEANS

STATEMENT OF THE INVENTION

A weighing apparatus includes load receiver stability indicating means arranged adjacent the conventional load read-out means for indicating when the movement of the load receiver member has diminished to an acceptable quasi-stable condition within a selected one of a plurality of tolerance ranges, thereby to shorten the time required to perform a weighing operation with a desired degree of accuracy.

BRIEF DESCRIPTION OF THE PRIOR ART

It is known in the weighing scale art to preset the operating modes and operating parameters in the weighing mode of the scale, whereby the weighing procedures are determined in accordance with given operating conditions. Among other things, the presetting mode can, on the basis of accuracy requirements, determine the tolerance range which the variations of the weighing result to be recorded and/or displayed should not exceed. In general, every time the swinging movement of the movably mounted load-receiving member of the scale progressively diminishes in amplitude of oscillation, a quasi-stable state is achieved in which the measurement value changes only within the specified tolerance range and no longer exceeds that range even after a certain waiting time. Only at the moment that this waiting time terminates is it guaranteed that the measurement value will have attained the required degree of accuracy and, accordingly, can be read off or can be released for possible further weight processing. This moment that marks the quasi-stable standstill condition of the scale is determined by standstill control means and is signaled to the scale user, for example, by the extinction of a display lamp. The illumination of this display lamp during a weighing process, on the other hand, indicates that the quasi-stable standstill state has not yet been attained.

One disadvantage in the prior weighing system described above, which in itself is rather very useful, is represented in certain cases of practical application by the circumstance that the tolerance range, preselected in the setting mode of the scale, is no longer indicated in the weighing mode because the particular display means are also associated with other options and, consequently, the tolerance range display disappears upon leaving the setting mode of the scale. To avoid this disadvantage, it would, of course, be obvious separately to provide additional display means that are intended for the display of the tolerance range and whose display is preserved as one switches from the setting mode to the weighing mode of the scale. Such a solution, however, would require additional space in the display field of the scale and would generally run contrary to the effort to attain the simplest possible overall illustration of all data required for the reading of a weighing result.

Weighing programs with frequent change of accuracy requirements represent another problem. The continuous adaptation of the tolerance range, under the existing conditions, proves to be quite time-consuming because, for this purpose, one must in each case leave the weighing mode and because one must, in the setting mode, via a configuration register, initiate the selection of another tolerance range. Because of this rather time-consuming situation, this in itself necessary adaptation often does not take place. But failure to make this adaptation can mean that the scale user occasionally must accept unnecessarily long waiting times until the reading of the weighing result or the weighing result would be read too early and with reduced accuracy.

The purpose of the present invention is to improve the scale of the kind mentioned initially in that the described disadvantages are avoided and, moreover, the idea is to create the possibility of having the scale user informed during the weighing as to the tolerance range in which the weighing result happens to be, without the user having to leave the weighing mode of the scale in order to get that piece of information.

SUMMARY OF THE INVENTION

A primary object of the present invention is to provide an improved weighing apparatus including stability indicating means arranged adjacent the usual load read-out means for visually indicating the time at which the movement of the load receiver diminishes to an acceptable quasi-stable condition within one of a plurality of different tolerance ranges.

According to a more specific object of the invention, the stability display means includes means for successively establishing different tolerance ranges, and means for indicating that tolerance range that is in effect at any given time. Preferably, the tolerance ranges progress from larger to smaller, so that for weight readings with a lesser degree of accuracy, the reading may be taken earlier in the weight read-out process, thereby reducing the weighing time.

According to a further object of the invention, the automatic stability detector means includes comparison means for comparing tolerance signals with first and second derivatives of the weight signal, thereby to operate driver means for illuminating the tolerance range display when the load receiving member is in an acceptable quasi-stable condition. In one embodiment, switch means are manually or automatically operable to connect one of a plurality of tolerance signals with the comparison means and to simultaneously activate the driver associated with the corresponding tolerance display. In a second embodiment, multistage comparison means compare the tolerance signals with the first and second derivative weight signals, thereby to activate the appropriate tolerance display driver.

According to the present invention, only if the accuracy requirement is also changed along with the weighing process may, undercertain circumstances, there be a need for switching into the setting mode of the scale to alter the tolerance range. Furthermore, the combination of the toelrance range display with the standstill display, according to the invention, avoids the requirement for more space for the display means and, besides, the handling of the scale is simplified and the reading of the weiging result is made easier.

As display means, for example, several optical indicators may be provided in a group and these indicators can be activated individually or in groups by control means, whereby the position of an indicator in the group indicates the particular tolerance range and the lighting up or extinction of an indicator signals the quasi-stable state of the scale within the tolerance range matched up with that particular indicator. The indicators, for example, can be annular and be arranged in concentric circles.

Another embodiment of the display means resides in providing an indicator with luminous numbers that can be activated, as desired, by control means to indicate the particular toelrance range, whereby the flashing or extinction of a number indicates the quasi-stable standstill condition of the scale in the tolerance range in the activated state which corresponds with this number.

According to another object of the invention, the device for the standstill check contains control means that cause the automatic switching of the predetermined tolerance ranges as a function of the response amplitude of the measurement value, specifically, in such a manner that, upon reaching the quasi-stable standstill condition of the scale, within a given tolerance range, the display is switched to the smaller tolerance range. The change of the various tolerances ranges is thus indicated continuously. This scale operating manner, without any advance selection of the tolerance range, enables the scale user, during each individual weighing operation, each time, to perceive the tolerance ranges, that the measurement value has run through as the scale swings while responding and he can then each time read off the measurement result if the quasi-stable standstill condition of the scale, in the tolerance range that is appropriate for the particular weighing operation, is signalled by the range switchover.

Furthermore, the control means mentioned above can be so designed that, upon leaving the quasi-stable standstill condition of the scale, within a given tolerance range, the system is switched each time to the next larger tolerance range. In this case, the control means thus also reacts to the external influences which disturb the quasi-stable balance of the scale. As a result, in the course of a weighing process, the respective tolerance range displayed always corresponds to the actual measurement amplitude.

The use of a common display device to indicate the tolerance range and to signal the quasi-stable standstill condition of the scale, in the case of optical indicators that either light up or are dark, leads to two possible solutions as regards standstill indication, in that the indicators either light up in the dynamic range of the weighing process and become dark when the stable range is reached, or are dark in the dynamic range and light up when entering the stable range. The indication of the tolerance range in the weighing mode thus takes place each time only either during the response swing or in the quasi-stable standstill condition of the scale. Which of these two solutions is to be used depends on other factors, for example, on whether a single-stage standstill display or a multi-stage standstill display is utilized to visualize the stabilization process. In the case of a single-stage standstill display, the tolerance range is preset and the standstill display reflects the tolerance range during each weighing operation. Whether the display is extinguished or lights up as the scale reaches the quasi-stable state is not particularly critical here, that is to say, the hitherto accustomed display mode may be retained. In the case of multi-stage standstill display, no presetting of the tolerance range is required, so that, during the response swing of the scale, the indicators, matched up with the individual tolerance ranges, successively take effect, and in this fashion provide a continuous display in whichever of the increasingly narrower tolerance ranges the quasi-stable standstill stage of the scale has been attained in each case. Here, the display mode, at which the quasi-stable standstill condition is indicated each time by the lighting up of the respective indicator, seems to be more appropriate.

BRIEF DESCRIPTION OF THE DRAWINGS

Other objects and advantages of the invention will become apparent from a study of the following specification, when viewed in the light of the accompanying drawings, in which.

DETAILED DESCRIPTION

Figure 1:
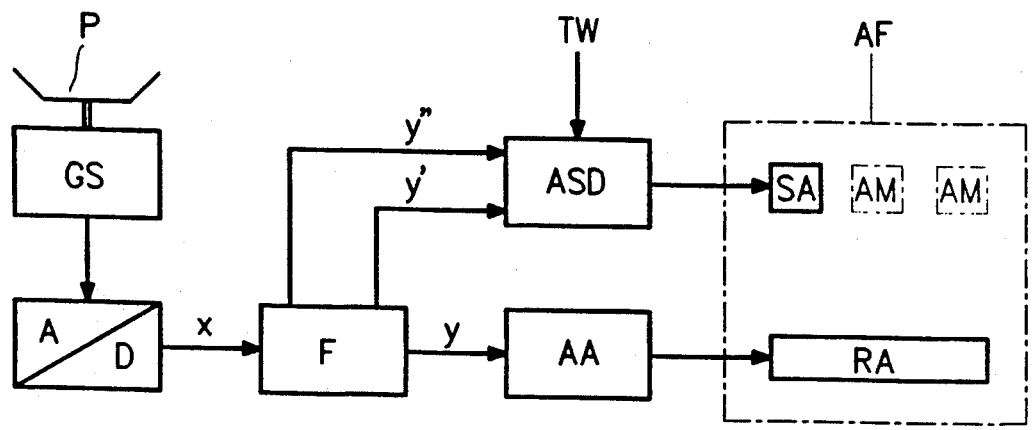
FIG. 1 is a block diagram of the electrical circuit of the weighing apparatus including standstill control means in accordance with the present invention.

Referring first more particularly to FIG. 1, the weighing apparatus includes load receiver P and weight sensor means GS that generates via an analog to digital converter A/D the basic weight signal x that is supplied as an input to the filter means F. The filter means F has a first output for supplying the filtered weight signal y to signal processing means AA the output of which is connected with the indication processing means RA of the display field AF. The filter means also supplies first and second derivative weight signals y' and y" to the corresponding inputs, respectively, of the automatic stability detector means ASD which compares these signals relative to predetermined tolerance ranges TW. During this process, the automatic stability detector ASD determines the moment at which the changes of the measurement value y, upon the response swing of the scale, in each case, no longer exceed one of a certain number of several predetermined tolerance ranges. The stability detector ASD signals that particular moment by the darkening or lighting of an optical indicator in a standstill display SA arranged in the display field. Additional display means AM for other weighing parameters may also be located in the display field AF but will not be discussed in any greater detail here.

Figure 2:
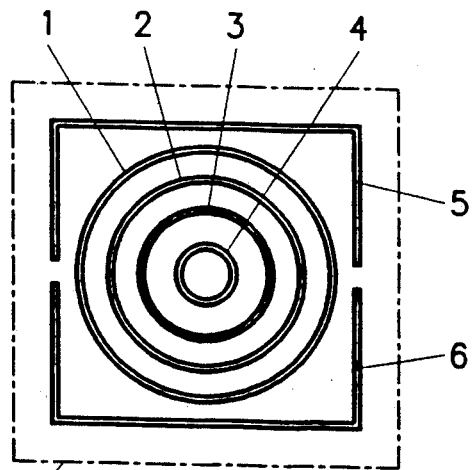
FIGS. 2 and 3 are detailed illustrations of two embodiments of the display means of the circuit of FIG. 1, respectively.

In a preferred embodiment of the invention, the display means for the standstill display SA, according to FIG. 2, includes several annular optical indicators 1, 2, 3 and 4 arranged in concentric circles. Corresponding with each of these annular indicators is a tolerance range whereby—in a manner similar to a rifle marksmanship target—the largest ring 1 marks the widest tolerance range (i.e., the maximum permissible scatter of the measurement values), and the smallest ring 4 marks the smallest tolerance range (or the smallest permissible scatter of the measurement values). These indicators are surrounded by a square frame, made up of two parts 5 and 6, which is constantly illuminated while the scale is in operation and which is intended to facilitate the differentiation of individual activated indicators by comparison with the frame size.

Figure 3:
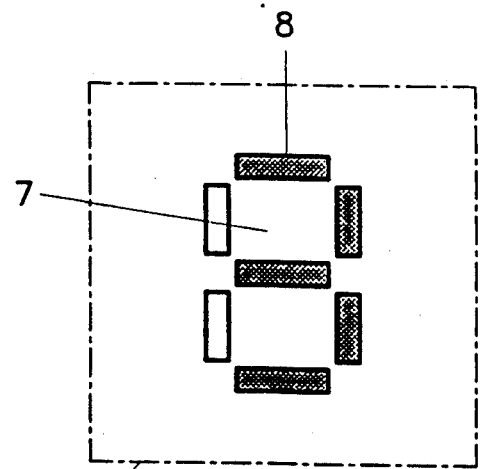

As display means of the standstill display SA, according to FIG. 3, an indicator 7 having selectable luminous numbers or digits may be provided. The means for the selection of this indicator 7 are substantially the same as in the arrangement according to FIG. 2.

In the case of single-stage standstill display, the desired tolerance range is preset in the initial regulating mode of the scale, whereby one of the indicators, 1 to 4, which corresponds with that particular tolerance range, is illuminated. Likewise, in the embodiment of FIG. 3, the respective number would be activated (e.g., "3"). Depending on the display mode selected, this display either is saved or is extinguished as the scale is switched into the weighing mode. Accordingly, the attainment of the quasi-stable state of the scale within the tolerance range matched up with this indicator is signalled by the darkening or lighting of this indicator. The display of the selected tolerance range thus is given also when the scale is in the weighing mode, specifically, either during the response swing of the scale or during the standstill phase of the scale.

Figure 4:
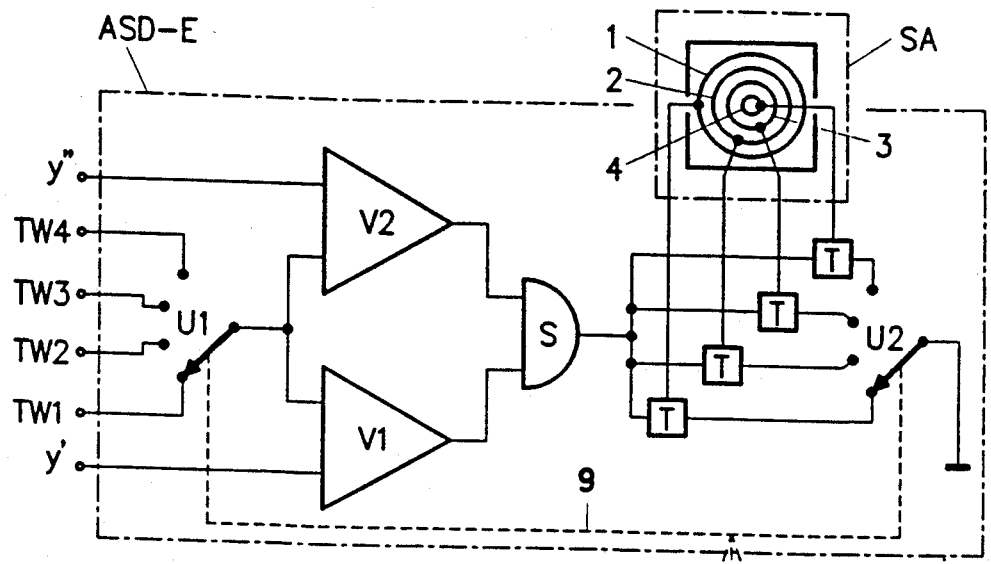
FIG. 4 is an electrical schematic diagram of a single-stage embodiment of the automatic stability detector means of FIG. 1.

FIG. 4 shows the basic structure of an automatic stability detector ASD-E for single-stage standstill display. Using a changeover switch U1, that tolerance value among tolerance values TW1 to TW4 is selected which is appropriate for the intended weighing operation. Assume now that TW1 defines the largest tolerance range while TW4 defines the smallest one.

The tolerance value set—for example, TW1—is supplied to the inputs of two comparison stages V1 and V2, for example, in the form of microprocessors. The first and second derivatives $y'$ and $y''$, respectively, of the weight value y, which is swinging in, are supplied individually to the comparison stages V1 and V2, respectively, and are compared in it with the tolerance value TW1. As soon as the input signals, corresponding to the first and second derivatives $y'$ and $y''$, fall below the tolerance value TW1 which has been set, the particular comparison stage V1 or V2 supplies an output signal. The outputs of the comparison stages V1 and V2 are connected with summation member S at whose output appears a signal if there is an output signal simultaneously at both comparison stages V1 and V2. The output signal of the summartion member S is used to activate the driver stages T that correspond individually with indicators 1 to 4 of standstill display SA. The connection of the driver stage T corresponding with a particular indicator is accomplished by a changeover switch U2 that is coupled with changeover switch U1 via gauged connection 9 that is manually or automatically operable by conventional switch operating means 10. In this way, in the example presented here, in the case of a quasi-stable standstill condition of the scale, in the tolerance range defined by the tolerance value TW1, indicator 1 is either darkened or lit up. As shown, indicator 1 is the one with the largest diameter, corresponding to the largest tolerance value set. The electronic means for signal processing in the manner described are known in themselves and will not be described in detail here.

Figure 5:
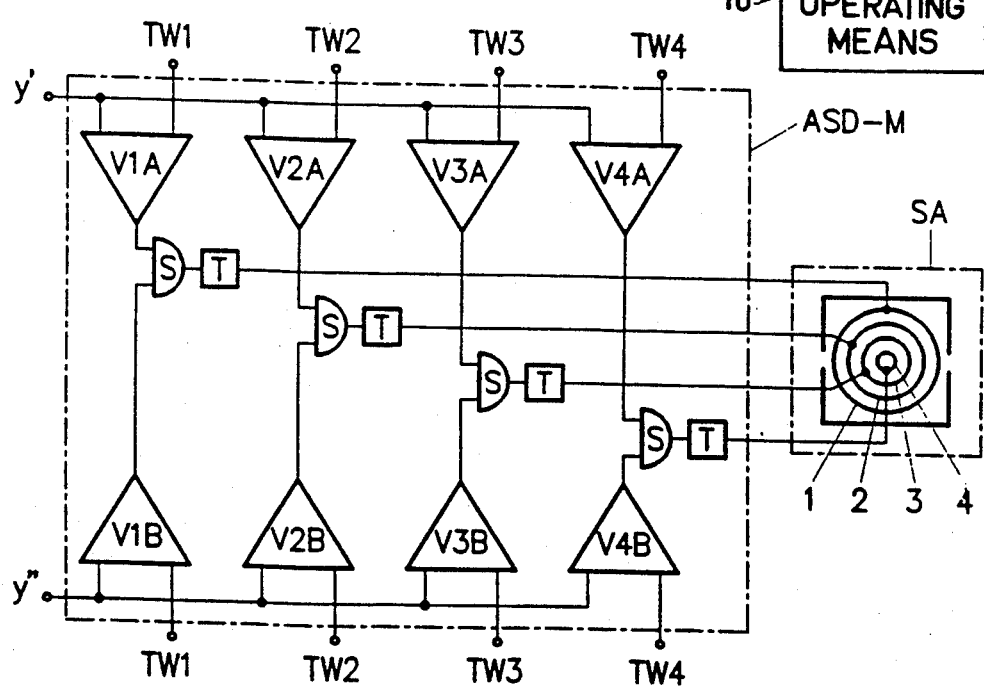
FIG. 5 is a circuit diagram of a multi-stage embodiment of the automatic stability detector means of FIG. 1.

Referring now to FIG. 5, in a multi-stage standstill display there is no presetting of a specific tolerance range and the display of the particular tolerance range in each case takes place only during a weighing process, in other words, when the scale is in the weighing mode. As the scale swings in, the indicators, corresponding with the individual tolerance ranges, are successively activated and indicate in which of the ever narrower tolerance ranges the quasi-stable standstill of the scale has been attained in each case. Thus, the automatic stability detector ASD-M for multi-stage standstill display, as compared to FIG. 4, includes for each tolerance value TW1 to TW4 an arrangement with two comparison stages V1A, V1B; V2A, V2B; V3A, B3B; or V4A, V4B, a summation member S and a drive stage T for the particular indicator 1, 2, 3, or 4 of standstill display SA. Here, the first derivative signal $y'$ to be monitored is supplied to the comparison stages V1A, V2A, V3A, and V4A, while the second derivative signal $y''$ to be monitored is supplied to comparison stages V1B, V2B, V3B, and V4B. As for the rest, this stability detector works in a manner similar to the one according to FIG. 4, the only difference being that indicators 1 to 4, upon the successive fading of the measurement value amplitude are selected whenever the quasi-stable standstill condition of the scale has been attained in the particular tolerance range.

Figure 6:
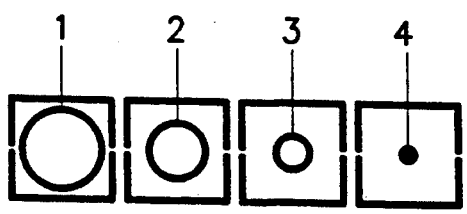
FIGS. 6 and 7, respectively, illustrate diagrammatically two different embodiments of the display means of the multi-stage standstill means of FIG. 5.
Figure 7:
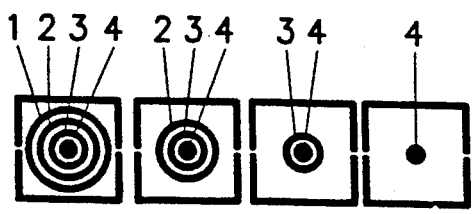

FIGS. 6 and 7 show two possible variations for continuous display of tolerance ranges run through during the fading of the measurement value amplitude and the attendant standstill displays. According to FIG. 6, the standstill display SA is so controlled that, upon attainment of the quasi-stable standstill condition within the maximum preset tolerance range, indicator 1 with the largest ring diameter is illuminated and, each time upon attainment of the quasi-stable standstill state within the next smaller tolerance range, the particular previously active indicator will be extinguished and indicator 2, 3, and 4, respectively, will light up with the next smaller ring diameter. Indicator 4 with the smallest ring diameter here appears as a dot.

In contrast to that, the standstill display SA according to FIG. 7 can also be so controlled that, upon attainment of the quasi-stable standstill stage within the biggest present tolerance range initially all indicators 1 to 4 will light up and, thereafter, in each case, the respective outermost ring will disappear, as soon as the quasi-stable standstill has been reached in the next smaller tolerance range.

In any case, along with the standstill display, there is simultaneously displayed the tolerance range for which the quasi-stable standstill of the scale is signalled.

Finally, the control means for the standstill check device can be so improved that, in the event that the quasi-stable standstill of the scale is not reached or maintained, respectively, with a tolerance range, a switchover to the next greater tolerance range takes place. In this way, in case of continuous display of the tolerance range in which the measurement value amplitude just happens to be moving, the user of the scale or any possibly existing devices for measurement value recording can recognize that the weighing process was disturbed by external influences that again amplify the amplitude of the oscillations of the scale. In that way, one can prevent the premature reading of the measurement value with a greater degree of certainty.

The other control means for switching the displayed tolerances ranges in the ascending or descending directions essentially consist of switching stages that record the presence of an output signal at the summation members S of the automatic stability detector ASD-M and convert a change of the signal state into a switching function for the purpose of turning the particular drive stage T on or off.

What is claimed is:

1. Weighing apparatus of the type including a load-receiving member (P) resiliently supported for movement relative to a stationary housing, comprising:

(a) load sensing means (GS) for generating a weight signal (x) that is a function of the applied load to be weighed;

(b) load display means (RA) responsive to said weight signal for providing a display that is a function of the magnitude of the applied load;

(c) stability detecting means (ASD) responsive to the movement of the load-receiving member relative to the housing for determining when the degree of stability of the load-receiving member during a load measurement falls within one of a plurality of progressively smaller predetermined tolerance ranges (TW1-TW4); and (d) stability display means (SA) connected with said stability detecting means and arranged adjacent said load display means for simultaneously indicating with the load display that one of the tolerance ranges (1-4; 7, 8) that corresponds with the actual quasi-stable condition of the load-receiving member.

2. Apparatus as defined in claim 1, wherein said stability display means includes a plurality of optical indicators (1-4) that are operable such that the position of an indicator in the group indicates the tolerance range within which the instantaneous quasi-stable condition falls.

3. Apparatus as defined in claim 2, wherein said optical indicators are annular and are arranged concentrically relative to each other.

4. Apparatus as defined in claim 1, wherein said stability display means comprise luminous sections (8) that are selectively operable to define readout integers that correspond with the actual stability tolerance range.

5. Apparatus as defined in claim 1, wherein said automatic stability detecting means includes control means for automatically successively activating said tolerance ranges, respectively.

6. Apparatus as defined in claim 5, wherein said automatic stability detector means includes switch means operable when the load-receiving member fails to maintain a quasi-stable standstill condition within a given tolerance range for switching the automatic stability detecting means back to the preceding higher tolerance range.

7. Apparatus as defined in claim 5, and further including means (F) for obtaining first (Y') and second (Y") derivative signals from said weight signal, and a source of tolerance range signals (TW1-TW4) corresponding with said tolerance ranges, respectively; and further wherein said automatic stability detector means includes single-stage comparison means (V1, V2; V1A-V4B) for comparing said first and second derivative signals with said tolerance signals, and a plurality of driver stage means (T) connected with said comparison means for activating said stability display means, respectively.

8. Apparatus as defined in claim 7, wherein said comparison means include multi-stage comparison means V1A, V1B to V4A, V4B) for comparing each of said first and second derivative signals with each of said tolerance signals, respectively.

* * * * *